United States Patent

Hauser

[15] 3,673,889
[45] July 4, 1972

[54] DIFFERENTIAL

[72] Inventor: Hans Hauser, Fredericktown, Ohio

[73] Assignee: The J. B. Foote Foundry Co., Fredericktown, Ohio

[22] Filed: Nov. 10, 1971

[21] Appl. No.: 197,539

Related U.S. Application Data

[63] Continuation of Ser. No. 16,642, March 5, 1970.

[52] U.S. Cl. .............................................. 74/713
[51] Int. Cl. .............................................. F16h 1/40
[58] Field of Search .................... 74/710, 710.5, 711, 713

[56] References Cited

UNITED STATES PATENTS

| | | | |
|---|---|---|---|
| 1,115,536 | 11/1914 | Hinkley | 74/713 |
| 1,546,893 | 7/1925 | Haubert | 74/713 UX |
| 1,883,725 | 10/1932 | Guilmette | 74/711 |
| 2,489,859 | 11/1949 | Butterworth | 74/711 |
| 3,365,984 | 1/1968 | Musgrave | 74/713 |
| 3,406,592 | 10/1968 | Von Kaler | 74/713 X |
| 3,470,768 | 10/1969 | Ford et al. | 74/713 |

Primary Examiner—Arthur T. McKeon
Attorney—Allen D. Gutchess, Jr.

[57] ABSTRACT

A differential is provided particularly for small self-propelled vehicles or machines such as lawn mowers, which differential is of simplified, sturdy design. Wheel axles within the differential have reduced ends which are received and rotatably supported directly in an idler shaft. These components are assembled prior to mounting the idler shaft in openings of the differential housing to assure proper alignment of the wheel axles and gears. Two miter gears are rotatably supported on the idler shaft and two additional miter gears are affixed to end portions of the wheel axles. A driven sprocket or gear is affixed to the housing which rotates the housing and the components about the common axis of the wheel axles. The differential housing is of two part construction, being joined along a line bisecting the openings which receive the idler shaft. The two housing parts are identical, which reduces manufacturing costs and also enables the driven sprocket to be mounted at two different locations on the differential housing to adapt the differential to particular requirements.

5 Claims, 3 Drawing Figures

PATENTED JUL 4 1972

3,673,889

INVENTOR.
HANS HAUSER
BY
Allen D. Gutchess, jr
ATTORNEY

DIFFERENTIAL

This is a continuation of application Ser. No. 16,642 filed Mar. 5, 1970.

This invention relates to a differential designed particularly for small self-propelled machines or vehicles, such as riding lawn mowers or self-propelled snow-blowers.

While numerous differentials are known in the art, the instant differential according to the invention has several features not heretofore known. The differential includes a housing with an idler shaft extending thereacross and held at its ends in openings in the housing. The differential housing is made in two parts joined along a line or plane intersecting both of the openings for the idler shaft. The two parts are also preferably identical which further reduces manufacturing costs and enables the driven sprocket to be affixed at either of two locations on the housing so that the differential is adaptable for a number of lawn mower designs without necessitating special changes in the differential design.

A central portion of the idler shaft has a passage extending therethrough which receives reduced ends of wheel axles, thereby to support the wheel axle ends. The idler shaft in turn is supported in the housing openings by a force fit, after first being assembled with the wheel axle ends. This assures that the wheel axles are properly aligned, thereby eliminating possible binding, by aligning them prior to assembly of the housing. The wheel axle ends are preferably supported in the idler shaft by an oil-impregnated bearing sleeve which substantially eliminates any need for subsequent lubrication or maintenance. With the reduced ends of the wheel axles received directly in the idler shaft, no additional parts are needed to support the wheel axles and the overall size of the differential can be reduced or held to a minimum.

It is, therefore, a principal object of the invention to provide an improved differential of simplified, low-cost design.

Another object of the invention is to provide a differential in which reduced ends of wheel axles are rotatably supported directly in an idler shaft.

Still another object of the invention is to provide a differential in which the wheel axles and miter gears are assured of proper positioning and alignment when assembled in the differential housing.

A further object of the invention is to provide a differential having two symmetrical housing parts to reduce costs and to enable a driven gear to be affixed at either of two locations on the differential.

Many other objects and advantages of the invention will be apparent from the following detailed description of a preferred embodiment thereof, reference being made to the accompanying drawings, in which.

Figure 1:
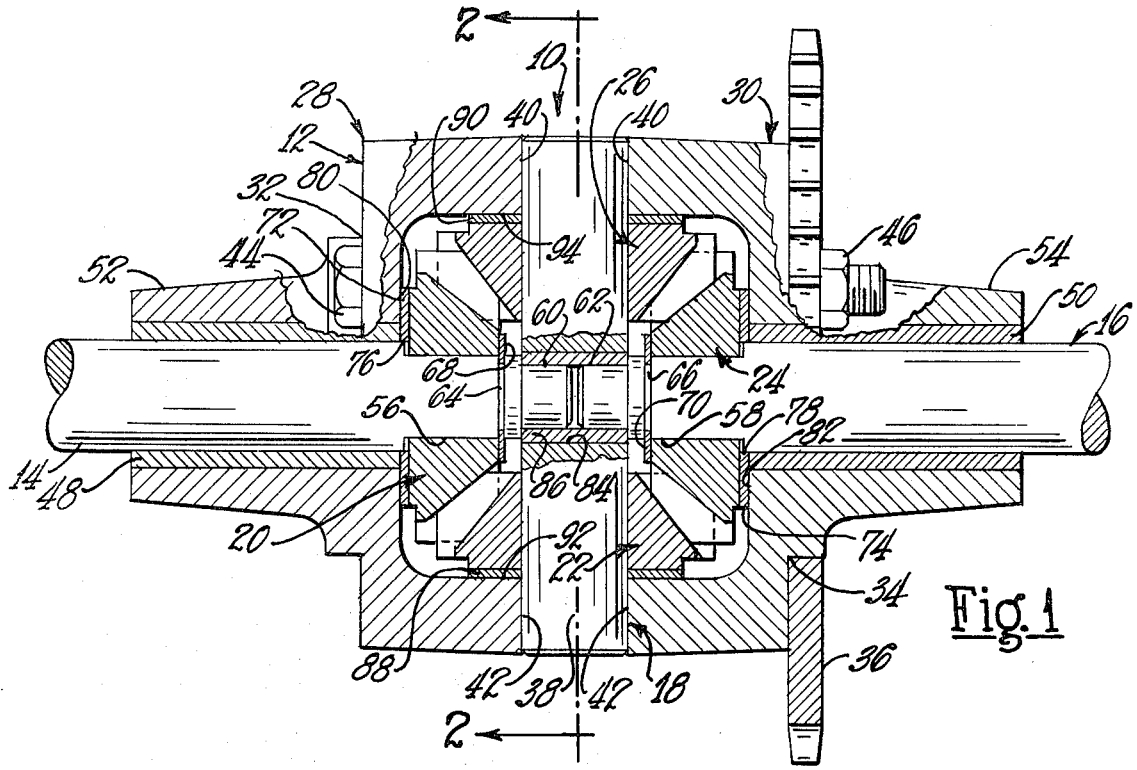
FIG. 1 is a view in elevation, with parts broken away and with parts in longitudinal cross section, of a differential embodying the invention.
Figure 2:
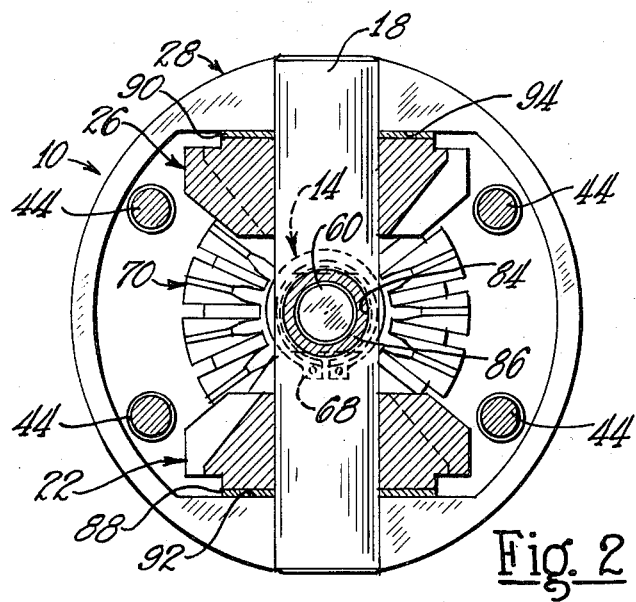
FIG. 2 is a view in transverse cross section taken along the line 2—2 of FIG. 1.
Figure 3:
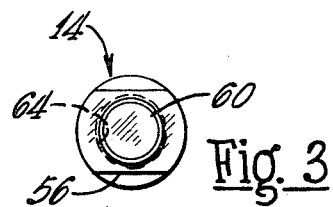
FIG. 3 is an end view of an axle of the differential.

Referring to the drawings, a differential according to the invention is indicated at 10 and includes a housing 12, wheel axles 14 and 16, an idler shaft 18, and miter gears 20, 22, 24, and 26. More specifically, the miter gears 20 and 24 are beveled side gears and the miter gears 22 and 26 are beveled pinion gears.

Referring now in more detail to the components, the differential housing 12 is made of two identical parts 28 and 30 providing two shoulders 32 and 34 at either of which a driven member or sprocket 26 can be mounted for rotating the housing 12 about the axes of the wheel axles 14 and 16. The sprocket 36 can be driven through a chain from a transmission mounted forwardly thereof which, in turn, is driven by an internal combustion engine. By enabling the sprocket 36 to be mounted at either of two positions, greater versatility for the transmission in adapting it to a particular vehicle or machine is achieved.

The two housing parts 28 and 30 are joined at a central line or plane 38 which bisect openings or recesses for the idler shaft 18. The openings or recesses are formed by matching notches 40 and 42 in the housing parts 28 and 30. The two housing parts are joined by bolts 44 and nuts 46 which clamp and securely hold the ends of the idler shaft 18 in the notches 40 and 42 when the two parts are fully assembled. The idler shaft thereby is held in a fixed position by a force fit in the openings.

The wheel axles 14 and 16 can be of various lengths, as needed for a particular vehicle or machine, wheels being suitably affixed to the ends of the axles. The axles extend through oil-impregnated bearing sleeves 48 and 50 affixed in end portions 52 and 54 of the housing parts 28 and 30, beyond the shoulders 32 and 34. The axles are aligned on a common axis which is also the axis of rotation of the housing 12. The shafts 14 and 16 within the housing 12 have non-circular portions 56 and 58 and end portions 60 and 62 of reduced diameter, the diameter being from about one-half to two-thirds of the diameter of the main axles 14 and 16. Near the inner ends of the non-circular portions 56 and 58 are grooves 64 and 66 which receive split rings 68 and 70. These hold the miter or bevel side gears 20 and 24 on the non-circular portions between the split rings and washers or annular bearing members 72 and 74. Inner openings 76 and 78 of the washers have diameters which exceed the diameters of the main portions of the axles 14 and 16, as shown, so as to be positioned between the gears 20 and 24 and adjacent inner surfaces 80 and 82 of the housing 12. The washers and surfaces thereby back up and support the miter gears 20 and 24 when meshing with the miter gears 22 and 26.

The idler shaft 18 is no larger in diameter than the wheel axles 14 and 16 and can even be somewhat smaller in diameter. The idler shaft 18 is free to move longitudinally prior to final assembly with the housing parts 28 and 30 so as to be in proper position with respect to the axles 14 and 16 when fully assembled. For this purpose, the openings formed by the notches 40 and 42 either extend completely through the housing 12, as shown, or are deep enough so that the ends thereof are spaced from the ends of the idler shaft 18. The center of the idler shaft 18 has a bore or passage 84 extending completely therethrough to receive the reduced ends 60 and 62 of the axles 14 and 16, the idler shaft 18 otherwise being of uniform cross section throughout its length. Preferably an oil-impregnated bearing sleeve 86 is positioned in the passage 84 to directly receive the ends 60 and 62.

The ends 60 and 62 of the axle 14 and 16 are received in alignment in the passage 84 and specifically in the bearing sleeve 86 prior to the assembly of the housing parts 28 and 30. Consequently, after assembly of the axles and idler shaft, when the parts 28 and 30 are bolted together to hold the idler shaft 18 securely in place, it is assured that the axles 14 and 16 will be co-axially aligned to prevent the possibility of any binding.

The miter or bevel gears 22 and 26 are rotatably mounted on the idler shaft 18, with washers or annular bearing members 88 and 90 being between the gears and annular inner surfaces 92 and 94 of the housing 12. The latter surfaces back up the gears 22 and 26 during operation. The gears 22 and 26 rotate only when one of the gears 20 and 24 and one of the wheels slips or rotates relative to the other, so that the gears 22 and 26 rotate relatively little.

Because the reduced ends 60 and 62 of the axles 14 and 16 are received directly in the idler shaft 18, rather than in some auxiliary component located around the shaft 18, the overall size of the differential 10 can be correspondingly reduced since minimum space is required for the internal components. Further, since the idler shaft 18 is free to be positioned longitudinally prior to the assembly of the housing parts 28 and 30, it is assured that the inner ends of the axles 14 and 16 will be properly aligned and fully supported. In assembly, the housing parts 28 and 30 are placed on the axles 14 and 16 but spaced apart. The axle ends 60 and 62 are then inserted in the passage 84. Grease is then placed in one of the housing parts 28 and 30 and the parts are then slid toward one another along the axles 14 and 16 and then bolted together by the bolts 44 and nuts 46 to clamp the idler shaft 18 in its predetermined, aligned position in the notches 40 and 42. With grease permanently in the housing 12 and with the oil-impregnated bearing sleeve 86 and the outer impregnated axle bearing sleeves 48 and 50, permanent lubrication and maintenance-free operation of the differential is achieved.

Various modifications of the above described embodiment of the invention will be apparent to those skilled in the art, and it is to be understood that such modifications can be made without departing from the invention, if they are within the spirit and the tenor of the accompanying claims.

I claim:

1. A differential comprising a housing forming two aligned openings, said housing being made of two parts joined along a line bisecting both of said housing openings, a driven member affixed to said housing to rotate said housing about an axis, a transverse idler shaft extending across said housing and having ends affixed in said openings in said housing, said idler shaft being positioned perpendicularly to the axis of rotation of said housing and said driven member, a pair of beveled pinion gears mounted for rotation on said idler shaft, two aligned wheel axles extending into said housing and positioned coaxially with the axis of rotation of said housing, the diameter of said idler shaft being substantially no larger than the diameters of said wheel axles, said idler shaft being free to move longitudinally in said openings prior to assembly of said idler shaft and said housing, whereby said idler shaft is self-aligning with respect to said wheel axles, said idler shaft being held in fixed relationship in said openings when said housing parts are assembled, said wheel axles having beveled side gears mounted thereon and engaged with said pinion gears in said housing, said axles having ends in said housing extending through and beyond said side gears, said ends of said axles beyond said side gears having reduced diameters, and said idler shaft forming a passage receiving and rotatably supporting said axle ends.

2. A differential according to claim 1 characterized by the reduced ends of said axles beyond said side gears having diameters not exceeding two-thirds the diameters of said wheel axles and said idler shaft.

3. A differential according to claim 1 characterized by said idler shaft having an oil-impregnated bearing in said passage which receives and rotatably supports said axle ends.

4. A differential according to claim 1 characterized by said idler shaft being of uniform cross section throughout its length, except for the passage therethrough.

5. A differential according to claim 1 characterized by annular bearing members rotatably mounted on said idler shaft between each of said beveled pinion gears and the adjacent inner surfaces of said housing to enable said housing to back up and support said pinion gears when meshing with said side gears, and additional annular bearing members rotatably mounted on said wheel axles between each of said beveled side gears and the adjacent inner surfaces of said housing to back up and support said side gears when meshing with said pinion gears.

* * * * *